(12) United States Patent
Chan (10) Patent No.: US 6,927,806 B2
(45) Date of Patent: Aug. 9, 2005

(54) SYSTEMS, METHODS AND APPARATUSES FOR MINIMIZING SUBSCRIBER-PERCEIVED DIGITAL VIDEO CHANNEL TUNING DELAY

(75) Inventor: Peter Chan, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 520 days.

(21) Appl. No.: 10/080,146

(22) Filed: Feb. 21, 2002

(65) Prior Publication Data

US 2003/0159157 A1 Aug. 21, 2003

(51) Int. Cl.$^7$ .................................................. H04N 5/80
(52) U.S. Cl. ...................................... 348/731; 725/38
(58) Field of Search ....................... 725/37, 38, 9, 725/14, 131, 138, 151, 139; 348/705, 731, 553, 732; H04N 5/80, 5/445; G06F 3/00, 13/00

(56) References Cited

U.S. PATENT DOCUMENTS

| | | | | |
|---|---|---|---|---|
| 5,502,506 A | * | 3/1996 | Choi ........................... 348/607 |
| 5,933,192 A | | 8/1999 | Crosby et al. .............. 348/387 |
| 6,118,498 A | | 9/2000 | Reitmeier ................... 348/725 |
| 6,334,217 B1 | | 12/2001 | Kim ............................ 725/38 |
| 6,473,137 B1 | * | 10/2002 | Godwin et al. ............. 348/725 |
| 6,490,001 B1 | | 12/2002 | Shintani et al. ............. 348/554 |
| 6,519,011 B1 | | 2/2003 | Shendar ....................... 348/731 |
| 6,538,704 B1 | * | 3/2003 | Grabb et al. ................ 348/731 |
| 6,804,824 B1 | * | 10/2004 | Potrebic et al. ............. 725/38 |

\* cited by examiner

*Primary Examiner*—Vivek Srivastava (57) ABSTRACT

A digital STB having multiple decoders is capable of decoding multiple digital video streams simultaneously to minimize the time a subscriber waits before a new channel is tuned and displayed. The STB incorporates a channel look-ahead capability in which one or more digital tuners tune to and decode a next video channel based upon information taken from a subscriber's usage history and information obtained from average subscriber behavior. STB software performs a channel prediction to setup spare tuning and decoding resources to tune to and decode a potential channel the subscriber might select next. The STB can therefore anticipate the subscriber's request and provide a faster response time for channel tuning.

19 Claims, 4 Drawing Sheets

SYSTEMS, METHODS AND APPARATUSES FOR MINIMIZING SUBSCRIBER-PERCEIVED DIGITAL VIDEO CHANNEL TUNING DELAY

FIELD OF THE INVENTION

The present invention generally relates to digital cable systems, and more particularly, to digital set-top boxes (STBs) having multiple decoders.

BACKGROUND OF THE INVENTION

Over the past twenty years there has been a substantial increase in the quantity of programming available to television viewers. In a typical American household, it is not uncommon for viewers to have available fifty or more television stations, and in some cases viewers have more than one hundred channels to choose from. Typically, the high number of channels often makes it difficult for viewers to efficiently locate any single program. Furthermore, due to the ever increasing number of channels and programs at the fingertips of the television viewer, viewers often have difficulty in deciding what station or program to watch. For instance, although a viewer may locate an interesting program, the viewer may still spend a considerable amount of time navigating the remaining channels to confirm that there isn't a more desirable program selection.

The high quantity of programming typically results in channel surfing, which viewers use as a method to quickly ascertain what is being shown on each channel. There are a number of aids to help television viewers with program selection. For instance, with the advent of digital broadcast systems, such as satellite systems and digital cable set-top systems, subscribers are typically offered interactive menus that allow-provide subscribers information regarding programming which is currently being aired and programming which is to be aired in the near future. Using these systems, subscribers can access a program guide that allows subscribers to interactively scroll through available programming, usually based on times and channels. Furthermore, subscribers can view details regarding programs scheduled to be aired at a specific time on a specific channel in the near future, such as the length of the program, a program summary, the program players or hosts, the program's rating, as well as other additional data.

Unfortunately, whether channel surfing or viewing program information from a program guide, subscribers of current digital systems experience delay when scrolling through channels or seeking program information. It may, for instance, take a subscriber 30 seconds to scroll through 30 channels. This result stems from the fact that normal MPEG encoded digital video channels suffer from long initial decoding time, which can typically result in a subscriber waiting a second or more before a channel is displayed. This delay is associated with MPEG data buffering prior to decoding and displaying the MPEG video images. This delay is particularly frustrating given the high number of channels available to subscribers.

What is needed is a system, method and tuner that minimizes this delay so as to allow subscribers to select a channel or program guide information and immediately view that channel or program information with minimal delay.

SUMMARY OF THE INVENTION

The present invention utilizes a digital STB having multiple decoders capable of simultaneously decoding multiple digital video streams to minimize the time a subscriber waits before a new channel is tuned and displayed. Specifically, the present invention provides channel look-ahead capability in which one or more digital decoders decode a next video channel based upon information taken from a subscriber's usage history and information obtained from average subscriber behavior. More specifically, smart and adaptive software performs a channel prediction to setup spare tuning and decoding resources to tune to a potential channel the subscriber might next select. The present invention utilizes a prediction algorithm to guess the next channel a subscriber may tune to such that the STB can anticipate the subscriber's request and provide a faster response time for channel tuning and decoding.

The predictability function of the channel prediction logic can best be demonstrated with reference to two illustrative examples of the present invention. For example, where a subscriber is surfing through a cable channel lineup by pressing the channel up key continuously, the STB can utilize the multiple tuners to tune to the next N channels simultaneously (where N is a number equal to or less than the free tuning and decoding resources available). Because the STB of the present invention can identify the subscriber's channel tuning pattern the STB can avoid the time normally required to tune to a next channel by having spare system resources perform the tuning and decoding task in advance in anticipation of the channel tune. Therefore, any delay in tuning to and decoding the MPEG video channel is hidden from the subscriber because this function is executed prior to the subscriber tuning to the channel.

In another illustrative example, a subscriber may be surfing through a cable channel lineup with a remote control unit by repeatedly pressing the 'last' or 'previous channel' key to go back and forth between two particular channels. In this scenario the channel prediction logic of the present invention can identify that the subscriber is repeatedly toggling between two channels and can use spare tuning and decoding resources to continuously decode to the 'last' channel such that next time the subscriber wishes to retune to the last channel there is no delay experienced by the subscriber. It will be appreciated that these examples are merely illustrative and are not intended to be limiting. For instance, the channel prediction logic of the present invention may continuously use system resources to tune to channels frequented by a subscriber based upon past history, to channels located on a subscriber favorite list, or even to a channel identified by the subscriber. Furthermore, different predictions made by a channel prediction logic may be weighted such that the STB will attempt to allocate its tuning resources to a channel most likely to be chosen next by the subscriber.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Because the functions and advantages of the present invention are based upon the ability of a multiple-tuner STB to receive data representing multiple channels simultaneously to effect the channel look-ahead capability, a brief summary of a Digital Broadband Delivery System (DBDS) will first be described, including the form and type of data delivered over the system to the STB of the present invention. Next, a STB according to the present invention and having a plurality of tuners to simultaneously receive a plurality of television channels will be described. Finally, a look-ahead tuning logic component within the STB will be discussed in detail, including the process by which the look-ahead tuning logic enables the STB to anticipate and tune to channels the STB predicts the subscriber will next select.

Figure 1:
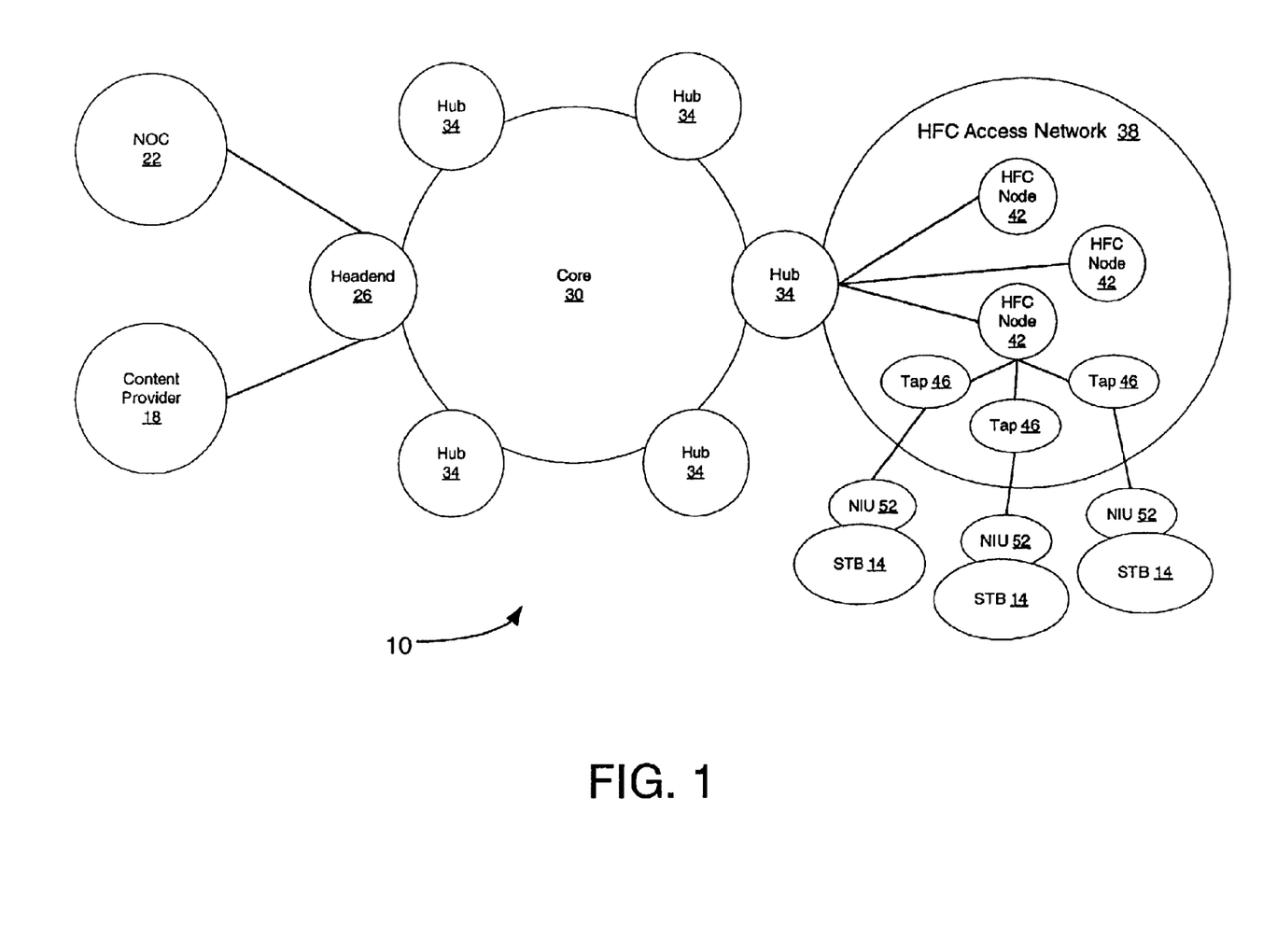
FIG. 1 shows a block diagram of a Digital Broadband Delivery System (DBDS) including a STB, according to one aspect of the present invention.

FIG. 1 shows a block diagram view of a Digital Broadband Delivery System (DBDS) 10, including a STB 14 of the present invention. Generally, the DBDS 10 is an integrated network system that features video, audio, voice and data services to Cable TV subscribers. Although FIG. 1 depicts a high level view of a DBDS including a regional HFC Access Network 38, as will be described below, it should be appreciated that a plurality of DBDSs can tie together a plurality of regional networks into an integrated global network so that Cable TV subscribers can receive content provided from anywhere in the world. The DBDS 10 shown in FIG. 1 delivers broadcast video signals as digitally formatted signals in addition to delivering traditional broadcast analog video signals. Furthermore, the system can support one way broadcast services as well as both one-way data services and two-way media and data services. The two-way operation of the network allows for subscriber interactivity with services, such as Pay-Per-View programming, View-on-Demand programs, and interactive applications, such as Email, Internet connections, and EPG applications.

The DBDS 10 provides the interfaces, network control, transport control, session control, and servers to access content and services, and distributes content and services to Cable TV subscribers. As shown in FIG. 1, a typical DBDS 10 is composed of interfaces to Content Providers 18, Network Operations Centers (NOC) 22, core networks 30 of headends 26, hubs 34, Hybrid Fiber/Coax (HFC) Access Networks 38, and subscribers' STBs 14. It should be appreciated that although single components (e.g., headend 26, core network 30, HFC Access network 38, etc.) are illustrated in FIG. 1, a DBDS 10 can feature a plurality of each of the illustrated components.

The Content Provider 18 represents one or more providers of content, such as video channels, music channels, data channels, video services, audio services and data services. For example, according to one aspect of the invention, the Content Provider 18 could comprise an Electronic Program Guide (EPG) data provider which acts as a data service provider. According to another aspect of the invention, the Content Provider 18 could represent an Internet Service Provider (ISP) providing data to the system to enable subscribers web access or web-enhanced video via the subscriber's television set. The Content Provider 18 transmits the content to a headend 26 for further transmission to subscribers downstream in the network. Also in communication with the headend 26 is a Network Operation Center (NOC) 22, which is an external management center interfaced with the DBDS 10 to allow for the remote operation of the system.

Content provided by the Content Provider 18 is communicated by the Content Provider 18 to one or more headends 26. From those headends 26 the content is then communicated to the core network 30 of hubs 34 and onto a plurality of Hybrid/Fiber Coax (HFC) Access Networks (only one HFC Access Network 38 is illustrated). The HFC Access Network 38 typically comprises a plurality of HFC nodes 42, each which may service a local geographical area. The content provided from the Content Provider 18 is transmitted through the headend 26, hub 34 and HFC Access Network 38 downstream to one or more taps 46 from each one of the HFC nodes 42 of the HFC Access Network 38. The hub 34 connects to the HFC node 42 through the fiber portion of the HFC Access Network 38. Usually, the HFC node 42 connects to a subscriber's STB 14 through coaxial cable in a logical tree configuration, which is where the optical-to-electrical and electrical-to-optical conversations of the HFC network take place. From the HFC node 42 a coaxial drop connects the tap 46 to a Network Interface Units (NIU) 52, which is a network demarcation point physically located on the side of the subscribers' home. The NIU 52 provides a transparent interface between the HFC node 42 and the subscribers' internal wiring. Coaxial cables are preferred in this part of the system because the electrical signals can be easily repeated with RF amplifiers. Typically, six amplifiers or less are located in series between the HFC node 42 and the subscribers' STBs 14. As DBDSs are well known to those of skill in the art, further description of the DBDS 10 of FIG. 1 will not be contained herein.

The present invention utilizes a STB having a plurality of decoders that can simultaneously receive and decode multiple digital channels received by one or more tuners over one or more transmission channels, described next with respect to FIG. 2. Because the present invention can simultaneously decode multiple channels, the present invention can perform look-ahead tuning, described in detail below, which enables a STB to anticipate a subscriber's next channel selection, and instantly present to the subscriber the next channel without tuning or decoding delay.

Figure 2:
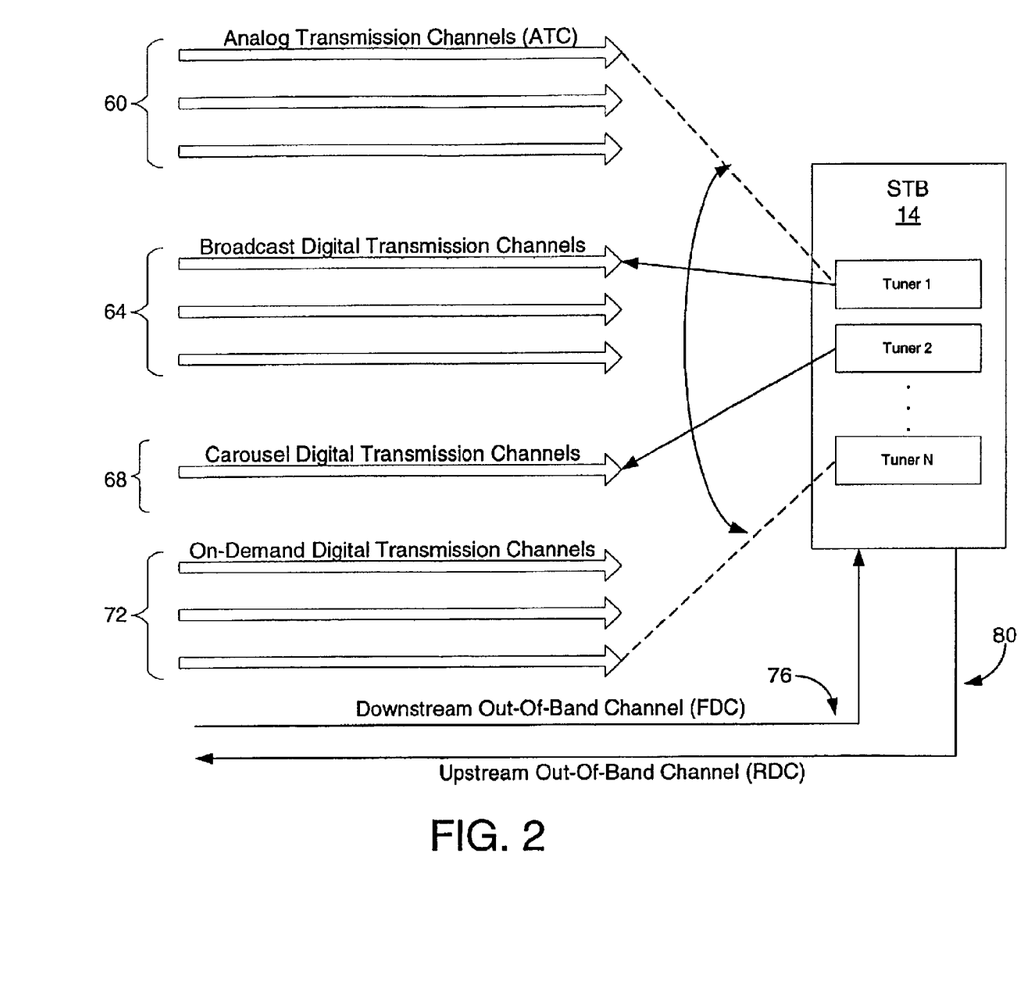
FIG. 2 shows input channels supported by a DBDS and input into a STB of the present invention, according to one aspect of the invention.

FIG. 2 shows illustrative channels supported by the DBDS, where the channels 60, 64, 68, 72 and 76 are input into a STB 14 of the present invention. These input channels can be provided by the one or more Content Providers 18 illustrated in FIG. 1. Additionally, a few channels can be generated at a Headend 26 or at a Hub 34 functioning as a mini-Headend which possesses some Headend functionality. As depicted in FIG. 2, the DBDS 10 can simultaneously support a number of transport channel types and modulation formats. The ability to carry analog and digital signals over a large bandwidth are characteristics of a Hybrid Fiber/Coax (HFC) Network typically employed in a DBDS, as in the DBDS 10 of FIG. 1. As will be appreciated by those of skill in the art, analog and digital signals in HFC networks can be multiplexed using Frequency Division Multiplexing (FDM), which enables many different types of signals to be transmitted over the DBDS 10 to the STB 14 of the present invention. Typically, a DBDS using HFC supports downstream (i.e., in the direction from the Headend to the STB) frequencies from 50 MHz to 870 MHz, whereas upstream frequencies (i.e., in the direction from the STB to higher levels of the system) are in the 5 MHz to 42 MHz band. Generally, the RF channel bandwidth spacing for analog and digital services is 6 MHz. Furthermore, for a typical 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. It should be understood that RF channels can be assigned to carry analog video signals but the present invention is not limited to embodiments where a RF channel is assigned to carry analog video signals upon fulfillment of a complete transition of the DBDS to an all digital system.

Referring again to FIG. 2, the downstream direction channels, having been multiplexed using frequency division multiplexing (FDM), and often referred to as in-band channels, include Analog Transmission Channels (ATCs) 60 and Digital Transmission Channels (DTC) 64, 68, 72 (also known as Digital Transport Channels). These channels carry video, audio and data services. For example, these channels can carry television signals, Internet data, or any additional types of data, such as Electronic Program Guide (EPG) data. The ATCs 60 shown in FIG. 2 are typically broadcast in 6 MHz channels having an analog broadcast composed of analog video and analog audio, and include Broadcast TV Systems Committee (BTSC) stereo and Secondary Audio Program (SAP) audio. Additionally, as will be appreciated by those of skill in the art, additional data, such as EPG data, can be sent with the analog video image in the Vertical Blanking Interval (VBI) of the video signal. It should be appreciated, however, that the amount of data that can be transmitted in the VBI of the analog video signal is typically significantly less than data transmitted in a DTC, as explained below.

Like the ATCs 60, the DTCs 64, 68, 72 each occupy 6 MHz of the RF spectrum. However, the DTCs 64, 68, 72 are digital channels consisting of 64- or 256-Quadrature Amplitude Modulated (QAM) digital signals formatted as MPEG-2 transport streams, allocated in a separate frequency range. As is well known in the art, the MPEG-2 transport stream enables transmission of a plurality of DTC channel types over each 6 MHz RF spacing, as compared to a 6 MHz ATC. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these Digital Transmission Channels (DTCs). However, because MPEG-2 transport stream multiplex video, audio, and data to be placed into the same stream, the DTCs do not necessarily have to be allocated in separate 6 MHz RF frequencies, unlike ATCs 60. On the other hand, each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. According to one aspect of the invention, encryption can be applied to the data stream for security so that the data, may be received only by authorized STBs. For instance, one individual subscriber may be authorized to receive minimal set of EPG data, while others may be authorized additional incremental amounts of EPG data (for example, EPG data for future days) according to a tiered service fee and/or depending on the amount of memory in the STB. Therefore, additional subscribers in the same local area not authorized to receive EPG data will not.

Each 6 MHz RF spacing assigned as a digital transmission channel can carry the video and audio streams of the programs of multiple television (TV) stations, as well as media and data that is not necessarily related to those TV programs or TV channels, as compared to one TV channel broadcast over one ATC 60 that consumes the entire 6 MHz. The digital data is inserted into MPEG transport streams carried through each 6 MHz channel assigned for digital transmission, and then de-multiplexed at the subscribers' STB so that multiple sets of data can be produced within each tuned 6 MHz frequency span.

The broadcast DTCs 64 and carousel DTCs 68 typically function as continuous feeds for indefinite time, whereas the on-demand DTCs 72 are continuous feeds sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 carry broadcast data, such as EPG data, that is systematically broadcast in a cycling fashion but updated and revised as need be. Thus, the carousel DTCs 68 can serve to carry high volume data, such as EPG data, as well as other data at high data rates. The carousel DTCs 68 typically carry data formatted in directories and files by a Broadcast File System (BFS), which is used for producing and transmitting data streams throughout the DBDS, and which provides an efficient means for the delivery of application executables and application data to the STB, as disclosed by co-pending application Ser. No. 09/319,844, entitled "Using a Hierarchical File System For Indexing Data Broadcast to a Client From a Network of Servers", filed Dec. 9, 1997, assigned to Scientific Atlanta, and incorporated herein by reference. The on-demand DTCs 72, on the other hand, can carry particular information such as compressed video and audio pertaining to subscriber requested program preview and/or program descriptions, as well as other specialized data information. Although broadcast in nature, the carousel DTCs 68 and on-demand DTCs 72 offer different functionality. The User-to-Network Download Protocol of the MPEG-2 standard's DSM-CC specification (Digital Storage Media-Command and Control) provides the data carousel protocol used for broadcasting data from a server located at headend 26. It also provides the interactive download protocol for reliable downloading of data from a server (possibly the same server) to an individual STB through the on-demand DTCs. Each carousel and on-demand DTC is defined by a DSM-CC session.

Also shown in FIG. 2 is an Out-Of-Band (OOB) channel that provides a continuously available two-way signaling path to the subscribers' STB 14 regardless of which in-band channels are tuned to by the individual STB in-band tuners. The OOB channel consists of a Forward Data Channel (FDC) 76 and a Reverse Data Channel (RDC) 80. The OOB channel can comply to any one of a number of well known transport protocols but preferably complies to either a DAVIC 1.1 Transport Protocol with a FDC of 1.544 Mbps or more using QPSK modulation and an RDC of 1.544 Mbps or more using QPSK modulation, or to a DOCSIS Transport Protocol with a FDC of 27 Mbps using 64-QAM modulation and a RDC of 1.544 Mbps or more using QPSK modulation or 16-QAM modulation. The OOB channels provide the two-way operation of the network, which allows a subscriber interactivity with the applications and services provided by the network. Therefore, functionality reflected in the STB 14 is similar to a networked computer (i.e., a computer without a persistent storage device), in addition to traditional set top box functionality, as is well known in the art. Furthermore, the OOB channels are not limited to a 6 MHz spectrum, but generally to a smaller spectrum, such as 1.5 or 3 MHz.

According to one preferred embodiment the present invention leverages the capability of a multiple tuner STB 14 to tune to multiple television channels to effect tuning to one or more channels a logic within the STB determines the subscriber is likely to choose next. Because available tuners and decoders (those not being used to decode a currently viewed MPEG stream representative of a currently viewed television channel) can tune to and decode channels the subscriber is likely to select next, the subscriber will not encounter tuning and decoding delay upon changing the channel. It will be appreciated, however, that the present invention can be effected using a STB 14 having multiple decoders but only one tuner where the look ahead function is limited to looking ahead to television channels received by the tuner on the same frequency as the presently viewed subscriber-selected digital channel. In this situation there is no need for a second tuner since one tuner is only needed to fetch data off a particular frequency. It should also be appreciated that the present invention will be discussed with respect to limiting the time the subscriber must wait before viewing another television channel. However, it will also be appreciated that the present invention can also be used to limit the time a subscriber must wait for program information, such as information requested from an electronic program guide. Thus, the present invention can utilize STB system resources to tune and decode any digital data the system expects the subscriber to request next, whether the data comprises a television channel or electronic program guide data.

The present invention provides a significant advantage over digital broadcast systems, such as digital satellite systems or digital cable set-top systems, where re-tuning to a separate channel requires time to buffer data for video decompression. Therefore, the present invention provides a method to simultaneously access video, audio and related media from multiple channels with little or no delay. Using a conventional system, it may take a subscriber thirty (30) seconds to scan through thirty (30) channels. Using the present invention, the subscriber can tune to different channels with no delay. Although the present invention will be described herein with reference to a digital data stream, it should be appreciated that content could also be provided over a dedicated analog channel to the HCT 145. However, an analog data stream may require both the content provider and HCT 145 to include synchronization hardware and software enabling video pictures and other content transmitted over the channel to be accurately received, stored and reconstructed at the HCT 145.

The STB 14, as will be described in detail with reference to FIG. 3, comprises a plurality of decoders to decode multiple television channels received via one or more tuners over one or more transmission channels. Preferably the present invention is implemented using multiple tuners, which enables the STB 14 of the present invention to tune to a plurality of downstream services, thereby allowing a subscriber to tune simultaneously to multiple services over multiple digital transmission channels, including television channels and other media content, transmitted in the downstream via the DBDS. As noted above, the present invention can alternatively be implemented using a STB having one tuner and multiple decoders, where the decoders can simultaneously decode data streams representing multiple television channels received over one tuner. For instance, because each digital transmission channel can receive and tune to multiple digital television channels, the present invention can be implemented using one tuner and multiple decoders for simultaneously decoding multiple television channels.

Because conventional STBs contain only one in-band tuner that can tune to one frequency at a time, and one decoder for decoding a single data stream, conventional STBs are limited to receiving data and decoding a limited amount of data. The present invention preferably utilizes the multiple tuners and multiple decoders within the STB to allow the reception and decoding of multiple channels received from varying frequencies simultaneously to minimize subscriber-perceived digital video channel tuning delay. Additionally, whereas a two-tuner STB may provide conventional STB functionality through a dedicated tuner for that purpose, and cable modem functionality through a second tuner dedicated to receive Internet data to be routed to a computer or PC externally connected to the STB via a network port such as an Ethernet or USB port, the present invention preferably employs multiple tuners to receive services to be processed within the STB and viewed through a TV display connected to the STB via a STB output port.

Figure 3:
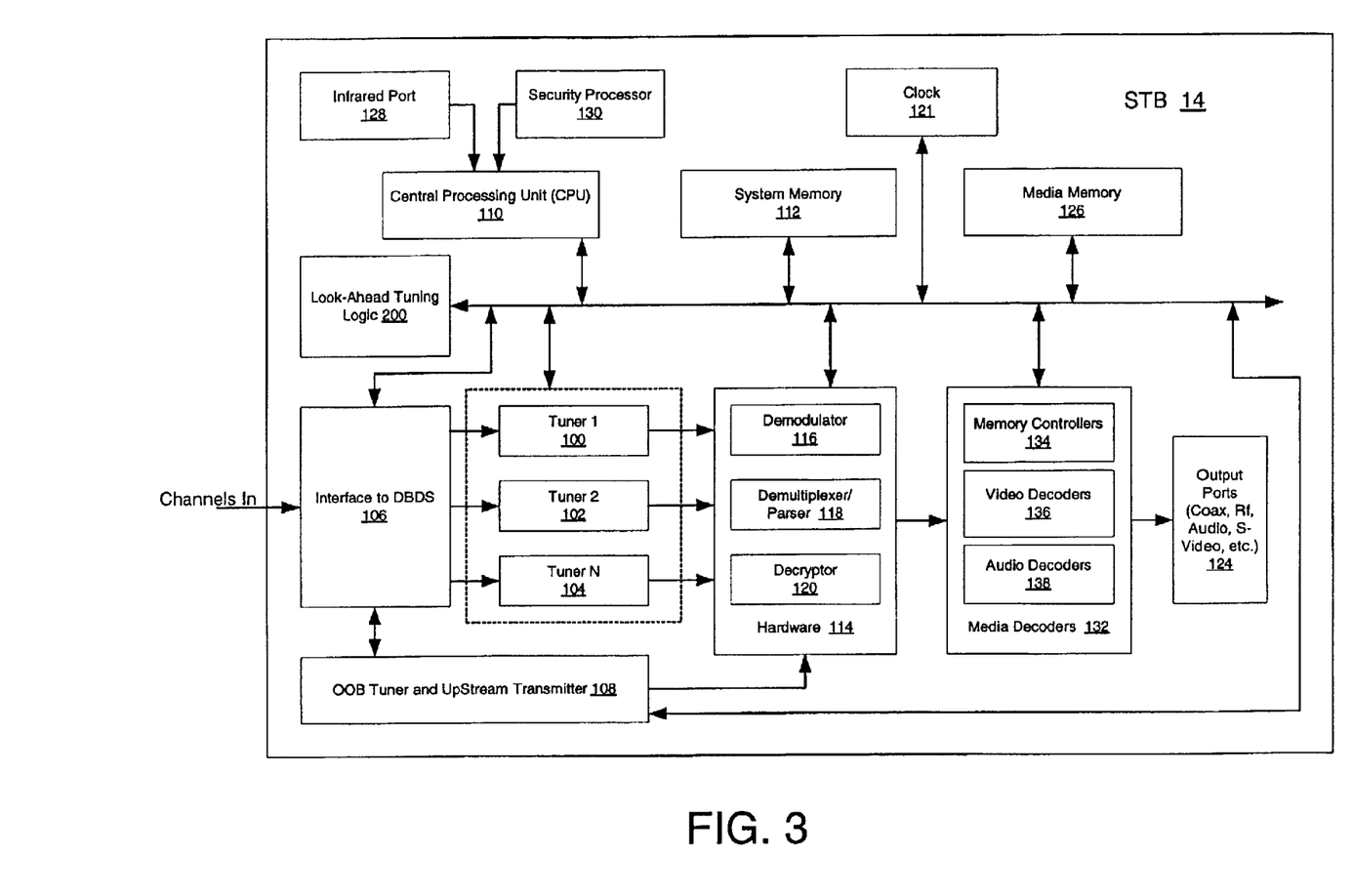
FIG. 3 is a block diagram of the components comprising the STB of FIG. 2, according to one aspect of the present invention.

FIG. 3 shows a block diagrams of components comprising the STB 14 of the present invention, according to one embodiment of the present invention. It should be appreciated that the systems and methods of the present invention are described below with reference to block diagrams and flowchart illustrations of systems, methods, apparatuses and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Referring again to FIG. 3, the STB 14 of the present invention includes an interface to the DBDS 106 through which the STB 14 receives data from a plurality of analog or digital channels, including analog and digital broadcast TV programs and data, collectively, services, including video, audio and data channels such as DOCSIS cable modem channels. More specifically, because each tuner 100, 102, 104 of the STB 14 can select only one in-band channel at a time, a plurality of tuners are provided so that multiple channels transmitting services can be received simultaneously using the STB of the present invention. Although the STB 14 may be implemented using two in-band tuners 100, 102, it may be advantageous to use multiple tuners where a large number of channels are to be displayed simultaneously. The greater the number of tuners included within the STB 14, the greater resources the STB 14 will have to tune to additional channels the STB 14 anticipates the subscriber may wish to view next. Preferably, the tuners 100, 102, 104 are capable of receiving signals from an HFC Plant (e.g., an 870 MHz HFC Plant), and each is capable of analog and digital (64/256 QAM) tuning to a single RF channel from a multiplicity of spaced RF channels (e.g., 6 MHz spaced RF channels in the US, 8 MHz in Europe).

Also included within the STB 14 is an Out-of-Band (OOB) tuner and upstream transmitter 108 which is connected to the interface to the DBDS 106. The OOB tuner and upstream transmitter 108 enable the STB 14 to interface with a DBDS network so that the STB 14 can provide upstream data to the network, for example, via a QPSK channel or a QAM channel. In this manner, a subscriber can interact with the DBDS to request services, such as Pay-Per-View programming and View-On-Demand programs and/or comprehensive EPG data for desired programs. It should be appreciated that although the OOB tuner and upstream transmitter are illustrated as one component in FIG. 3, the tuner and transmitter can be independent of each other and located separately within the STB 14, as in FIG. 4, where an OOB 108 and upstream transmitter 109 are separate components of the STB 14. Nonetheless, both components must be in communication with the DBDS so that upstream transmissions can be received by the system. According to one aspect of the invention, a telephone modem in the STB 14 can be utilized for upstream data transmission and a headend 26, hub 34 or other component located upstream in the DBDS can receive data from a telephone network in communication with the telephone modem, where the telephone network routes the upstream data to a destination internal or external to the DBDS, such as a Content Provider.

Referring again to the STB 14 shown in FIG. 3, after the one or more tuners 100, 102, 104 select one or more transmission channels, incoming data is forwarded to hardware 114 comprising circuitry with capability for demodulating 116, demultiplexing and parsing 118, and decrypting 120 the incoming signals. More specifically, the hardware components 114 are capable of QAM demodulation, Forward Error Correction (FER), Parsing MPEG-2 Transport Streams, Packetized Elementary Streams and Elementary Streams, and Decryption, as is well known in the art, to counter the effect of signal processing of broadcast media and data in the DBDS. Particularly, such signal processing is performed at the headend 26 and in some cases it may be performed in part at the hubs 34. Received compressed video streams and audio streams can be deposited continuously into Compressed Audio and Video Buffers of Media Memory 126. Although not illustrated in the embodiment of FIG. 3, additional components can be included within the hardware 114, such as descramblers, decoders, digitizers, signal amplifiers, and other circuitry for signal or error recovery.

One primary component of the STB 14 is the CPU 110, which controls the functions of the STB 14 via a real-time, multi-threaded operating system that enables task scheduling and switching capabilities. More specifically, the CPU 110 operates to execute programs, stored in System Memory 112, under the auspices of the Real-Time Operating System. The CPU 110 may be directed to execute a Watch TV application by a viewer when the viewer presses keys of an remote control, such as an infrared or UHF remote control, associated with the STB 14. Infrared or UHF signals are received through a port 128 in the STB 14. For instance, where a viewer requests to view a particular channel, a Watch TV application executing on CPU 110 will cause the CPU 110 to generate a request message for the particular television channel. This request can be transmitted to an available tuner such that the subscriber can view the requested program.

Also included within the STB 14 is a Media Decoders 132 which further processes signals for output via output ports 124 to a television set or display. The output ports 124 preferably comprise a RF Channel 3 and 4 output to drive an analog TV or Display or other device such as a VCR, as well as an output video port to drive a display, monitor or TV set that receives an analog TV signal at its input. Additionally, it should be appreciated that the TV or display may be connected to the STB 14 via a video port such as Composite Video, S-Video, or Component Video. The output ports 124 can also comprise Digital Component Video or an IEEE-1394 interface to drive a TV or Display that receives non-compressed digital TV signals at its input. The Media Decoders 132 includes components for analog and digital video decoding, as well as analog and digital audio decoding, as are well known in the art. It should be appreciated that the Media Decoders 132 represents that the STB 14 can include many decoders, and not necessarily one decoder for each tuner. Therefore, the STB 14 can include more (or fewer) decoders than the number of tuners within the STB 14. As shown in FIG. 3, components of the STB 14 include an analog descrambler and analog video decoder with capability for analog video or audio descrambling, and a security processor 130 working in conjunction with a decryptor 120 to decrypt encrypted digital video, audio or data, as is well known to those of skill in the art. The security processor 130 functions to authorize paying subscribers' STBs to execute specialized features of the STB 14, such as executing the EPG software application and receiving EPG Data.

The STB 14 also includes Memory Controllers 134 and a Media Memory 126. These components can include software and hardware to compose and store graphical information created by the CPU 110. These components enable the compositing of graphical data (e.g., EPG content) with video into a picture for a TV display as provided by capabilities in Media Decoders 132. Such compositions include graphics data overlayed on video, or downscaled video overlayed onto graphics, or a composition of non-overlapping downscaled motion video pictures and graphic partitions of display.

Lastly, FIG. 3 shows a Look-Ahead Tuning logic 200 within the STB 14. As will be discussed with respect to FIG. 4, the Look-Ahead Tuning logic 200 predicts a channel, channels or content that a subscriber may next view, and utilizes available resources of the STB 14 to continuously tune to and decode the predicted channels such that the subscriber does not have to wait for tuning should the subscriber change the channel to one of the predicted channels. As illustrated in FIG. 3, the Look-Ahead Tuning logic 200 is in communication with hardware and software components within the STB 14, which the Look-Ahead Tuning logic 200 must query to determine if resources are available to effect look-ahead tuning. Additionally, if the resources are available, the Look-Ahead Tuning logic 200 will request that the resources tune to and decode the channel or channels the Look-Ahead Tuning logic 200 determines are most likely to be selected next by the subscriber.

Figure 4:
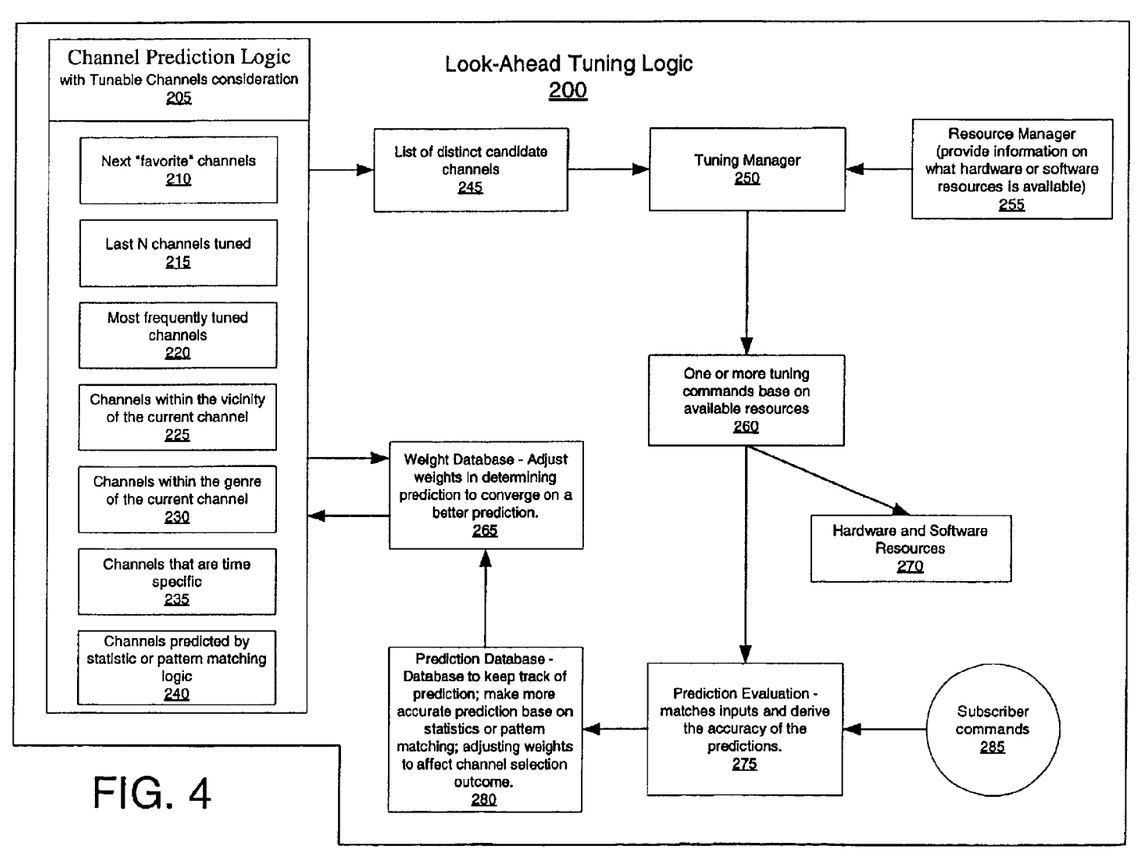
FIG. 4 is a block diagram of the look-ahead tuning logic of the STB of FIG. 3, according to one embodiment of the present invention.

FIG. 4 is a block diagram of the Look-Ahead Tuning logic 200 of the STB 14 of FIG. 3, according to one embodiment of the present invention. It should be appreciated by those of ordinary skill in the art that FIG. 4 only describes one possible implementation of the Look-Ahead Tuning logic, and that many other implementations are obvious to those of skill in the art given the present description. FIG. 4 depicts a Look-Ahead Tuning logic 200 where channel predictions are continuously refined to maximize the likelihood of pre-tuning to a channel that the subscriber actually will watch. The subscriber's channel tuning experience is enhanced, shortened, and simplified with the Look-Ahead Tuning logic 200.

Basically, the Look-Ahead Tuning logic 200 illustrated in FIG. 4 comprises a feedback system where channel prediction is adjusted based on feedback from the subscriber based on subscriber commands 285. Subscriber commands 285 are typically input using a remote control device, though it will be appreciated that the commands may also be entered directly into the STB 14. Some of the measurable feedback originating from the subscriber can include: (1) What channels the subscriber has tuned the most in terms of frequency and duration; (2) The channel surfing pattern of the subscriber; (3) Which subscriber in the household is tuning; (4) The duration between pauses during channel change; (5) The time-of-day of the channel surfing action; (6) The frequency of the predicted channels that were physically tuned but not needed by the subscriber; (7) The frequency of the predicted channels that were physically tuned but were skipped by the subscriber. That is, if the subscriber paused on the channel but moved on to other channels; and (8) The frequency of the "predicted" channels that were physically tuned and the subscriber watched for a period of time.

Referring again to FIG. 4, the Look-Ahead Tuning logic 200 includes a channel prediction logic 205. The channel prediction logic 205 contains independent logic components to generate a list of candidate channels to which the STB 14 will tune and decode using available resources. The logic components include: next favorite channels 210, last N channels tuned (i.e., viewed by the subscriber) 215, most frequently tuned channels 220, channels within the vicinity of the current channel 225, channels within the genre of the current channel 230, channels that are time specific 235, and channels predicted by a statistic or pattern matching logic 240. Each of these are more fully described below.

The next favorite channels logic 210 has access to a subscriber's favorite channels, which are channels the subscriber has shown interest in. These favorite channels can be created from subscriber input and stored in STB memory or derived from subscriber interaction with the channel surfing process. For instance, this logic can assign a next favorite channel status to those channels the subscriber has selected most over the past week, on that particular day, or the like.

The last N channels tuned logic 215 maintains a list of N distinct channels that the subscriber has recently tuned to (i.e., viewed), where N is a positive integer. Next, the most frequently tuned channels logic 220 maintains a list of M distinct channels that the subscriber has tuned to most frequency where M is a positive integer. For instance, this logic can assign a next favorite channel status to those channels the subscriber has selected most over the past week, on that particular day, or the like. Channels within the vicinity of the current channel logic 225 maintains a list of available distinct channels that are within the vicinity of the current active channel. For example, if channel 89 is tuned and the channel lineup has channels available from 2 to 200, the vicinity of channel 89 would be the channels within the range of 89 plus or minus P channels, where P is a positive integer. In this case, if P is 5 then the vicinity of 89 would be channels 84 through 94.

Channels within the genre of the current channel logic 230 may select and maintain a list of channels that matches the genre of the channel watched by the subscriber, where a watched channel may be defined as a channel that the subscriber stayed on for a period of time. For instance, where a subscriber watches a large number of sporting events, the genre of the current channel logic 230 may select and maintain the of channels specializing in sports or showing a sports broadcast. Next, the channels that are time specific logic 235 maintains a list of channels that matches the duration of the time-of-day. For example, between 9 PM through 11:30 PM, the list might contain all channels that are showing news. Lastly, channels predicted by statistics or pattern matching logic 240 is a channel list generated by statistics, pattern matching, neural network, random guessing, or some system specific method.

According to one embodiment of the invention, using one or more of the logic components 210–240 described immediately above the channel prediction logic 205 generates several lists of candidate channels to which the STB 14 can devote available tuning and decoding resources to tune to and decode. Preferably, the channel prediction logic 205 block will then consolidate each of the lists created by each of the logic components 210–240 into one list 245 with distinct candidate channels. According to one aspect of the invention, this list 245 may be created based upon the channels that are noted by most logic components. According to another aspect of the invention, the channel prediction logic 205 will retrieve weighted values from a weight database 265. These weighted values may be used to reinforce or reject candidate channel selections. Using these weighted values, the consolidated candidate list 245 will have, for each channel, an associated possibility or priority factor. For example, the candidates in the consolidate list may be ordered in highest to lowest priority according to their respective weighted values. The consolidated list 245 is then communicated to the tuning manager 250.

Briefly, the tuning manager 250 manages the tuning resources, including determining the tuning and decoding resources available. Based upon the resources available, the tuning manager 250 will select channels from the candidate list 245 and match the channels with the available hardware. To effect this match the tuning manager 250 relies on real-time hardware availability information received from the resource manager 255. Tuning resources can include items such as tuners, data paths (i.e., Ethernet, RF, IEEE-1394, etc.), decoders (i.e., MPEG video/audio decoder, etc.), clock synchronization devices, hardware or software data filters, and the like. Next, the tuning manager 250 issues tuning commands 260 to the appropriate resources 270 in order to fully match the maximum number of candidate channels to the hardware resources. The tuning manager 250 also must manage available resources 270 that might appear or disappear in real-time. For example, tuner and decoder resources might disappear if a picture-in-picture feature is suddenly activated by a subscriber.

The prediction evaluation logic 275 gathers the information from subscriber interaction, which includes commands 285 received from the various input devices (e.g., remote control, keyboard, mouse, etc.), and the tuning commands 260 issued by the tuning manager 250. This logic 275 determines the accuracy of the predictions by denoting channels as being 'hit' or 'missed', where a channel that is 'hit' is a channel that was predicted to be watched by the subscriber and was watched by the subscriber, and where a 'missed' channel is one that was predicted to be watched by the subscriber but was not. Prediction evaluation logic can then use this information to adjust a prediction database to effect a more accurate predictions in the future. According to one aspect of the invention, the prediction evaluation logic 275 can produce positive reinforcement for all 'hit' channels and negative reinforcement for all 'missed' channels. The reinforcement comes via adjustment to the prediction database 280.

Although the prediction database 280 is illustrated as located within the Look-Ahead Tuning logic 200, and this within the STB 14, it should be appreciated that the prediction database 280 can also comprise an entity situated at a cable plant headend. In one implementation, the prediction database 280 gathers and stores information from prediction evaluation logic 275 associated with multiple set-top boxes. The requirement for this implementation is that the STB 14 can transmit information back to the cable plant headend. The benefit of having a centralized database is that statistics and subscriber behaviors can be extracted from multiple subscribers to derive a more generic and accurate channel tuning prediction model. Additionally, special external conditions and events (e.g. Super Bowl, Olympic, etc.) can be factored into the model. The prediction database 280 can update the weight database 265 for STBs in real-time or on some periodic schedule. In a system where the prediction database 280 is de-centralized and local to the STB 14, the prediction database 280 can still effect the many benefits of the centralized system with the exception of not benefiting from behaviors learned from the masses (i.e. interactions between other subscribers and their STBs).

Referring again to the weight database 265, the weight database 265 contains a set of data that the channel prediction logic 205 can use to make the candidate channel list 245. In the simplest implementation, all the independent logic (as mentioned previously) might be equal likely since the weights would be equal. The weights, however, may be manipulated by the prediction database 280 based on feedback from other sources and are used to either perform positive or negative reinforcement in creating the candidate channel list 245. For example, if a subscriber does a lot of toggling between the current and last channel, the weight for the last N channels tuned logic 215 would be positively reinforced. With a higher weight factor, the last N channels tuned logic 215 would get higher priority placement in the final candidate channel list 245. In turn, the tuning manager 250 is more likely to assign the few resources to pre-tune these higher likelihood channels.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A digital set-top box for minimizing subscriber-perceived digital video channel tuning delay, comprising:
   a first decoder;
   a second decoder;
   a look-ahead tuning logic in communication with said first decoder and said second decoder, wherein said look-ahead tuning logic instructs said second decoder to decode a television channel predicted by said look-ahead tuning logic; and
   a prediction evaluator, wherein said prediction evaluator is configured to determine if said television channel predicted by said look-ahead tuning logic matches a subsequent subscriber requested television channel,
   wherein the prediction evaluator is further configured to adjust said look-ahead tuning logic to effect more accurate channel predictions in the future, based on the accuracy of past channel predictions.

2. The digital set-top box of claim 1, wherein said look-ahead tuning logic comprises a channel prediction logic, wherein said channel prediction logic compiles a list of television channels, and wherein said look-ahead tuning logic selects said predicted television channel from said list of television channels.

3. The digital set-top box of claim 2, wherein said list of television channels is created based in part on a current channel decoded by said first decoder.

4. The digital set-top box of claim 2, further comprising a memory in communication with said look-ahead tuning logic, where said memory stores a historical log of channels recently decoded by said first decoder.

5. The digital set-top box of claim 4, wherein said list of television channels is created based in part upon a said historical log of channels.

6. The digital set-top box of claim 2, further comprising a weighting database, wherein said weighting database orders said television channels to generate said list of television channels.

7. The digital set-top box of claim 1, further comprising a decoder manager, wherein said decoder manager determines if said second decoder is available to decode said television channel predicted by said look-ahead tuning logic.

8. The digital set-top box of claim 1, wherein said look-ahead tuning logic comprises a feedback loop.

9. A method executed in digital set-top box having at least two decoders, comprising:
   receiving a request from a subscriber to view a first television channel;
   decoding said first television channel using a first decoder;
   predicting a next television channel to be requested by said subscriber;
   decoding said predicted next television channel using a second decoder;
   determining if said predicted next television channel matches a subsequent subscriber requested television channel; and
   automatically adjusting future channel predictions based on the accuracy of past channel predictions.

10. The method of claim 9, wherein the step of predicting a next television channel is based in part upon the subscriber's most frequently watched television channels.

11. The method of claim 9, wherein the step of predicting a next television channel is based in part upon the identity of said first television channel.

12. The method of claim 9, wherein the step of predicting a next television channel comprises compiling a list of candidate television channels, wherein said next television channel is chosen from said list of candidate television channels.

13. A method executed in digital set-top box having at least two decoders, comprising:

receiving a request from a subscriber to view a first television channel;

decoding said first television channel using a first decoder;

predicting a next television channel to be requested by said subscriber, wherein predicting a next television channel comprises compiling a list of candidate television channels, wherein said next television channel is chosen from said list of candidate television channels;

decoding said predicted next television channel using a second decoder; and     organizing said list of candidate television channels based upon weights generated by evaluating the accuracy of past predictions of television channels to be selected by said subscriber.

14. The method of claim 13, further comprising the step of determining the determining the resources available for tuning to said predicted next television channel.

15. The method of claim 13, further comprising tracking said prediction to determine the accuracy of said prediction.

16. The method of claim 15, further comprising using said accuracy of said prediction to predict subsequent television channels to be requested by said subscriber.

17. The method of claim 13, further comprising the step of storing the identity of said predicted television channel in memory.

18. The method of claim 13, further comprising the step of storing a historical log of television channels requested by said subscriber.

19. The method of claim 13, further comprising the step of instantaneously presenting said predicted next television channel for viewing by a subscriber.

\* \* \* \* \*